No. 800,861. PATENTED OCT. 3, 1905.
A. T. MARSHALL.
CRANK SHAFT LUBRICATING APPARATUS.
APPLICATION FILED MAR. 4, 1904.
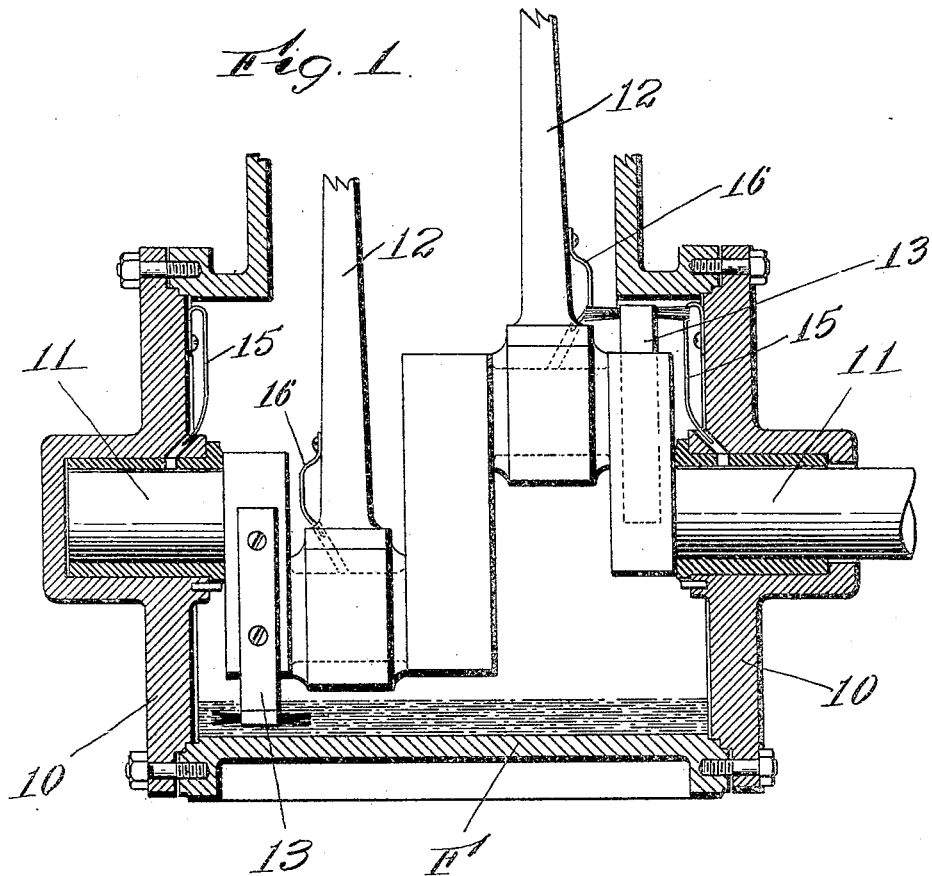
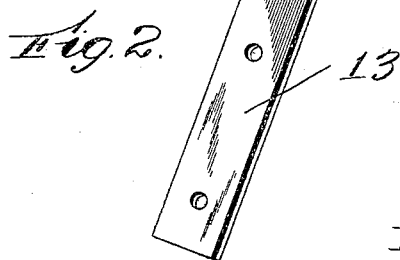
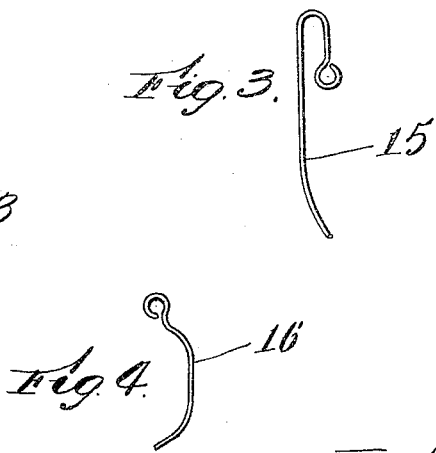
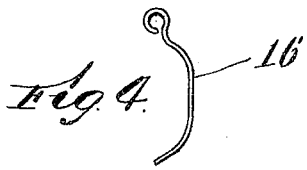
Witnesses:
C. F. Mason
M. E. Regan
Inventor:
A. T. Marshall
By his Attorneys
Southgate & Southgate

UNITED STATES PATENT OFFICE.

ALBERT T. MARSHALL, OF SWAMPSCOTT, MASSACHUSETTS, ASSIGNOR, BY MESNE ASSIGNMENTS, TO AUTOMATIC REFRIGERATING COMPANY, A CORPORATION OF NEW JERSEY.

CRANK-SHAFT-LUBRICATING APPARATUS.

No. 800,861.     Specification of Letters Patent.     Patented Oct. 3, 1905.

Application filed March 4, 1904. Serial No. 196,482.

*To all whom it may concern:*

Be it known that I, ALBERT T. MARSHALL, a citizen of the United States, residing at Swampscott, in the county of Essex and State of Massachusetts, have invented a new and useful Crank-Shaft-Lubricating Apparatus, of which the following is a specification.

This invention relates to a lubricating device for oiling the crank-shaft and pitman bearings of an engine, an air-compressor, or other machinery.

The especial object of this invention is to provide a simple and efficient construction in which a single oil-carrying brush is used for conveying oil both to a pitman-bearing and to one of the crank-shaft bearings.

To this end this invention consists of the parts and combinations of parts as hereinafter described, and more particularly pointed out in the claims at the end of this specification.

In the accompanying drawings, Figure 1 is a fragmentary sectional view of sufficient parts of an engine or other machine to illustrate the application of my invention thereto. Fig. 2 is a perspective view of the wiping-brush. Fig. 3 is a view of one of the guide-wires for directing oil to one of the crank-shaft bearings, and Fig. 4 is a view of a guide-wire for directing oil to a pitman-bearing.

In that class of engines in which a crank-shaft is inclosed within a casing it has heretofore been the practice either to have the crank-shaft itself dip down into the oil contained in the casing or else to use oil-conveying devices for circulating the oil around the bearings of the engine.

The especial object of my present invention is to improve and simplify the lubricating devices of this class by providing a construction in which each wiping-brush coöperates with two guide-wires, one guide-wire directing oil to one of the crank-shaft bearings and the other guide-wire directing oil to a pitman-bearing.

Referring to the accompanying drawings for a detail description of an apparatus embodying this invention, F designates the casing or frame of an engine, an air-compressor, or similar machine. Bolted to the casing or frame F are bearing-heads 10, and journaled in boxes in the heads 10 is a crank-shaft 11. The crank-shaft may be of the single or double type. As herein illustrated, the engine or other machine is provided with a doubly-offset crank-shaft. Connected with the crank-pins of the shaft 11 are the pitman or connecting rods 12.

Each set of lubricating devices constructed according to my invention comprises a wiping-brush consisting of a piece of sheet metal 13, which is fastened by screws to one of the crank-arms of the crank-shaft. At its end the sheet-metal piece 13 is provided with an ear or roll which receives the brushes or bristles for conveying oil from the bottom of the engine-casing.

Coöperating with the wiping-brush is a guide-wire 15, having a downwardly-extending end extending into an oil-hole of one of the crank-shaft bearings, and also coöperating with the wiping-brush is a guide-wire 16, having its free end extending into an oil-hole of a pitman or connecting rod bearing.

In connection with a double crank-shaft two sets of oiling devices are used.

As illustrated in Fig. 1, one of the wiping-brushes will be moved down into the oil while the other wiping-brush is passing its guide-wires and conveying oil thereto which will lubricate a pitman or connecting rod bearing and one of the crank-shaft bearings.

I am aware that changes may be made in practicing my invention by those who are skilled in the art without departing from the scope thereof as expressed in the claims and that my invention may be used in connection with different types of engine or air-compressor constructions. I do not wish, therefore, to be limited to the construction I have herein shown and described; but What I do claim, and desire to secure by Letters Patent of the United States, is—

1. In a construction of the class described, the combination of the frame, a crank-shaft journaled therein, a connecting-rod, two guide-wires, one directing oil to a connecting-rod bearing and the other to a crank-shaft bearing, and a wiping-brush turning with the crank-arm of the crank-shaft so as to pass between the guide-wires and the opposite sides of said brush simultaneously engaging said wires.

2. In a construction of the class described, the combination of a frame, a crank-shaft journaled therein, a connecting-rod, a wiping-brush consisting of a holder with bristles extending horizontally from opposite sides thereof, a guide-wire directing oil to a crank-shaft bearing and a guide-wire directing oil to the pitman-bearing, said brush being arranged to pass between the guide-wires so as to be simultaneously engaged upon opposite sides.

3. In a construction of the class described, the combination of a casing, a double-bent crank-shaft journaled therein, two connecting-rods, two brushes, one turning with each crank-arm of the crank-shaft and two guide-wires coöperating with each brush, said brushes being arranged to pass between the guide-wires and to be simultaneously engaged upon opposite sides therewith.

In testimony whereof I have hereunto set my hand in the presence of two subscribing witnesses.

ALBERT T. MARSHALL.

Witnesses:
   PHILIP W. SOUTHGATE,
   LOUIS W. SOUTHGATE.